United States Patent [19]

Huisman et al.

[11] Patent Number: 4,732,813

[45] Date of Patent: Mar. 22, 1988

[54] MAGNETIC RECORDING ELEMENT

[75] Inventors: Hendrikus F. Huisman, Steenbergen; Henricus J. M. Pigmans, Eindhoven, both of Netherlands

[73] Assignee: PD Magnetics, B.V., Oosterhout, Netherlands

[21] Appl. No.: 42,268

[22] Filed: Apr. 24, 1987

[30] Foreign Application Priority Data

Apr. 29, 1986 [NL] Netherlands ............... 8601097

[51] Int. Cl.$^4$ ............................................. G11B 5/706
[52] U.S. Cl. ............................ 428/425.9; 427/128; 252/62.54; 428/694; 428/695; 428/900
[58] Field of Search ............ 428/694, 695, 900, 425.9, 428/328, 329, 704; 252/62.54; 360/134–136; 427/128, 131

[56] References Cited

U.S. PATENT DOCUMENTS

| | | | |
|---|---|---|---|
| 3,428,603 | 2/1969 | Kroenke | 252/62.54 |
| 4,153,754 | 5/1979 | Huisman | 428/900 |
| 4,197,357 | 4/1980 | Huisman | 428/692 |
| 4,309,176 | 1/1982 | Friese et al. | 8/94.23 |
| 4,533,565 | 8/1985 | Okita | 428/900 |
| 4,578,314 | 3/1986 | Ohta | 428/405 |
| 4,584,243 | 4/1986 | Kadokura | 428/900 |

FOREIGN PATENT DOCUMENTS 3232117 3/1984 Fed. Rep. of Germany ... 252/62.54

OTHER PUBLICATIONS

Patent Abstracts of Japan, vol. 8, No. 23, 1/31/84, & JP. A, 58 179 936 (Konishiroku Shakshin Kogyo K.K.) 10/21/83.

Primary Examiner—Ellis P. Robinson

[57] ABSTRACT

A magnetic recording element having a carrier and a magnetic coating provided thereon containing a magnetic pigment, a binder and a dispersing agent which is an amine or amide compound containing a sulfuric or sulfonic acid group.

2 Claims, No Drawings

MAGNETIC RECORDING ELEMENT

FIELD OF INVENTION

The invention relates to a magnetic recording element comprising a carrier and a magnetic coating provided thereon which has a binder, a magnetic pigment and a dispersing agent, the pigment being finely distributed in the binder under the influence of the dispersing agent.

BACKGROUND OF THE INVENTION

Magnetic recording elements consist basically of a carrier or a substrate on which is coated an adherent layer of finely divided magnetic pigment particles which are dispersed in a matrix of polymeric binder.

The recording element is used for recording audio and/or video information. The element may take the form of a plate or disc, but it preferably has the form of a tape.

The carrier is usually manufactured from a synthetic resin, for example, polyester or polyvinyl chloride, but it may also consist of such materials as paper or metal.

The magnetic pigment comprises the usual ferromagnetic particles, for example, Fe particles, $CrO_2$ particles or alpha-$Fe_2O_3$ particles which optionally are doped with other elements such as Co, Ni, Zn, Sn or Ti.

In order to be able to readily disperse the pigment particles evenly throughout the binder, to prevent the formation of agglomerates of particles as well as to break up existing agglomerates, dispersing agents are used.

During operation, the tape is moved past the record and replay head of the record and replay device, which is better known as a recorder. If the tape has been out of use or stored for a while, the mechanical and magnetic properties of the tape are found to have changed. In particular, the frictional resistance of the tape sliding over the head has changed, which results in a different tape transport behavior. Applicants have found that the above-mentioned change is caused, at least in part, by the dispersing agent used in the magnetic coating.

A dispersing agent is used in order to be able to readily disperse the generally needle-shaped pigment particles having a length of about 0.1–1 μm in the binder and thus to preclude the formation of agglomerate of particles or decompose them. Various dispersing agents are known for this purpose, such as lecithin, esters of phosphoric acid and alcohols which may be ethoxylated and alkylarylsulfonic acids. Dispersing agents are surface-active substances which have a surface-active, polar group in the molecule, such as a sulfonic acid group, a carboxyl group or a hydroxyl group as well as a nonpolar group, such as an aliphatic hydrocarbon radical with 12–20 carbon atoms. The polar group of the dispersing agent molecule adheres to the polar surface of the pigment particle. The nonpolar groups of the molecules of the dispersing agent so adsorbed on the surface of the pigment particle screen the said particle and preclude interaction with other pigment particles.

Applicants have found, in particular, that the above-mentioned change in the mechanical and magnetic properties of the recording element is caused by the fact that the dispersing agent used does not exhibit a uniform surface activity. The frequently used dispersing agent, lecithin, for example, contains a large number of components which have a very different surface activity. Within the large set of lecithin components, there is always one or more than one component which adsorbs at the special surface of the particle to be dispersed. A disadvantage is that the other components are loose in the system. The use of such a dispersing agent in the magnetic coating of recording elements has for its result that the nonadsorbed components of the dispersing agent soften the binder matrix and/or diffuse to the surface of the magnetic coating. This adversely affects, in particular, the mechanical properties of the recording element, particularly the frictional properties. Other disadvantages are a considerable soiling of the head and a sticky surface making layers stick together.

Another dispersing agent which is often used is based on esters of phosphoric acid and alcohols. Also in this case there are big differences in surface activity due to the fact that several components are present which each have a different surface activity. These components are, for example, free phosphoric acid, mono-, di- and tri-esters as well as the free alcohol. The presence of many components in a dispersing agent can often be attributed to the preparation process, which causes the introduction of impurities which cannot, or only with difficulty, be removed.

Therefore, there remains a significant need for a recording element having improved mechanical and magnetic properties. In particular, there is a need for a magnetic recording element, especially magnetic tape, having improved tape transport behavior, ergo one which contains a dispersing agent having more uniform surface activity.

SUMMARY OF THE INVENTION

The above-described needs are met in large part by the invention which is directed to a magnetic recording element comprising a carrier and a magnetic coating provided thereon which has a polyester urethane binder, a magnetic pigment and a dispersing agent, the pigment being finely distributed in the binder under the influence of the dispersing agent, characterized in that the dispersing agent is a compound of the following formula:

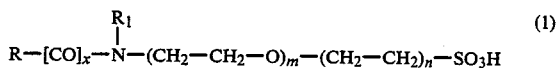

$$R-[CO]_x-\underset{\underset{R_1}{|}}{N}-(CH_2-CH_2-O)_m-(CH_2-CH_2)_n-SO_3H \qquad (1)$$

or a salt therof, in which
- R is an alkyl group or an alkylaryl group having 6–30 C atoms,
- $R_1$ is a hydrogen atom, alkyl group having 1–4 C atoms or the group $-(CH_2-CH_2-O)_m-(CH_2-CH_2)_n-SO_3H$ or a salt thereof,
- m = 2–20,
- n = 0 or 1, and x = 0 or 1.

DETAILED DESCRIPTION OF THE INVENTION

A. Dispersing Agent

The compounds in accordance with Formula 1 above are amines (x=0) or amides (x=1) which contain a sulfuric acid group $-O-SO_3H$ (n=0) or a sulfonic acid group $-SO_3H$ (n=1). The dispersing agent can also be the salt of the acid indicated in Formula 1 and, consequently, contain a sulfate group or a sulfonate group. The salt is a metal salt, an alkali metal salt or an alkaline earth metal salt. Preferably the Na or Ca salt is used. Examples of the group R are hexyl, octyl, dodecyl, stearyl, tetracosyl, butylphenyl and heptylphenyl.

The above-described dispersing agent used in the recording element in accordance with the invention has a uniform surface activity. This means that there is no variation in the surface-active group (polar group) of the molecules of the dispersing agent. Yet there may be a small variation per molecule in the length or structure of the substituent R. If R represents, for example, a branched alkyl group, the branches per molecule may be oriented somewhat differently. There may also be some variation per molecule as to the length of the ethylene oxide group, i.e., the value of n.

Due to the uniform surface activity, the dispersing agent, which has a very high dispersing power, can be used in a relatively small amount preferably 1–3% by weight calculated on the pigment.

In a preferred embodiment of the invention, a compound of Formula 1 or a salt thereof is used as a dispersing agent, in which R is an alkyl group have 6–20 carbon atoms and $R_1$ is a methyl group.

B. Polymeric Binder

In the recording element in accordance with the invention, the usual binders are used. Examples of suitable binders are, for example, polyvinyl chloride, polyvinyl acetate, polyacrylates, polyester, polyester amides, polyurethanes and copolymers of at least two monomers selected from the group consisting of vinyl chloride, vinyl acetate, acrylonitrile, vinyl alcohol, vinyl butyral and vinylidene chloride. Suitable binders are, in particular, polyurethanes and partially hydrolysed copolymers of vinyl chloride and vinyl acetate.

C. Magnetic Pigment

The magnetic pigment contains the usual ferromagnetic particles such as Fe particles, $CrO_2$ particles and $\gamma$-$Fe_2O_3$ particles which, if desired, may be doped with other elements such as Co, Ni, Zn, Sn or Ti. In general, the particles are needle-shaped and have a length of 0.1–1 $\mu$m and a thickness of 0.01–0.02 $\mu$m.

Apart from the magnetic particles and the dispersing agent, still other auxiliary substances may be dissolved or dispersed in the binder, such as, for example, a lubricant. Suitable lubricants are, for example, oleic acids, mineral oils, fatty amides or mixtures thereof.

D. Preparation of the Recording Medium

The preparation of the recording medium in accordance with the invention can be carried out as usual, for example, by thoroughly mixing the magnetic particles, the dispersing agent and part of the binder by means of a ball mill in a solvent for the binder. The remainder of the binder dissolved in a suitable solvent and the lubricant are then added and the whole is ground further in the ball mill for a few hours. Organic liquids, such as esters, for example, ethyl acetate, ethers, for example, tetrahydrofuran, ketones, such as methyl ethyl ketone, methyl isobutyl ketone and cyclohexanone, hydrocarbons, such as toluene, and chlorinated hydrocarbons, such as 1,2-dichlorethane, may be used as solvents for the binder. The above-mentioned process can also be carried out in one step in which all ingredients are simultaneously fed into the ball mill. The amount of lubricant is, generally, from 0.1–10% by weight calculated on the amount of binder. The amount of magnetic particles (pigment) amounts to approximately 60–85% by weight calculated on the total magnetic coating.

After the dispersion has been thoroughly ground in the ball mill, the larger magnetic particles which may be present are sieved and the magnetic coating obtained is provided on the carrier in a uniform layer. As already noted hereinbefore, the carrier may be in the form of a tape, plate, disc and the like and, dependent upon the material from which the carrier has been manufactured, may optionally be provided with a suitable bonding layer for the magnetic coating to be provided on the carrier. In addition to the bonding layer, other layers, for example an antistatic layer, may be provided. The assembly is then dried, the solvent evaporated which gives a recording layer having a thickness from 2 to 10 $\mu$m remaining on the carrier.

This layer may optionally be cured to promote resistance to detrition and may moreover be subjected to a calendering process in which the surface of the layer becomes smoother.

The invention will now be described in greater detail with reference to the ensuing specific examples.

EXAMPLES

EXAMPLE 1

A first video tape was manufactured from a magnetic coating layer made by mixing in a ball mill having 600 glass balls the following constituents:
100 parts by weight of chronium dioxide
2 parts by weight of a dispersing agent in accordance with Formula 1 in which R is stearyl, $R_1$ is methyl, $m=6$, $n=1$ and $x=1$
17 parts by weight of polyester urethane having a molecular weight of 50,000–150,000 (binder) added as a 16% solution in tetrahydrofuran
1 part by weight of butyl stearate (lubricant)
0.3 parts by weight of zinc stearate (lubricant)
0.05 parts by weight of stearamide (lubricant)
3 parts by weight of isocyanate hardener
80 parts by weight of tetrahydrofuran.
60 parts by weight of methyl isobutyl ketone
100 parts by weight of cyclohexanone.

The mixture is mixed for a few hours, then filtered and provided as a layer on a polyester foil in a thickness of 15 $\mu$m. After drying and calendering, the layer thickness of the coating layer (magnetic recording medium) of the resulting video tape was 2.5 $\mu$m.

EXAMPLE 2

In a corresponding manner, a second video tape was manufactured in which a compound of Formula 1 was used as a dispersing agent in which R is dodecyl, $R_1$ is methyl, $m=8$, $n=0$ and $x=0$.

EXAMPLE 3

A comparative video tape was also manufactured in which 5 parts by weight of lecithin were used as a dispersing agent.

The mechanical and magnetic properties of these tapes were tested according to the standards applied for this purpose. The frictional resistance of the tapes moving past a record/replay head was measured before and after the life test during which the tapes were stored at a temperature of 50° C. and a degree of moistness of 80% for a period of 2 weeks.

The measured magnetic properties were (1) S/N luminance, which is the signal-to-noise ratio of the brightness signal relatively with respect to a reference tape measured at a frequency of 4.3 MHz; (2) the S/N chroma, which is the signal-to-noise ratio of the color signal measured relatively with respect to a reference tape at the output of the recorder; and (3) RF output, which is the voltage value of the brightness signal measured at both 3 MHz and 5 MHz.

The results of the above-mentioned tests are recorded in the table below:

characterized in that the dispersing agent is a compound of the following formula:

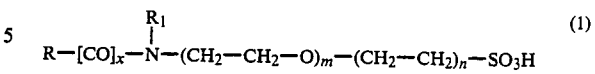

TABLE 1

| Example | 1 | 2 | 3 |
| --- | --- | --- | --- |
| Dispersing Agent | Formula 1 in which R is stearyl, $R_1$ is methyl, m = 6, n = 1, x = 1 | Formula 1 in which R is dodecyl, $R_1$ is methyl, m = 8, n = 0, x = 0 | Lecithin |
| S/N Chroma | 1.7 | 1.6 | 1.4 |
| S/N Chroma After Life Test | 1.4 | 1.5 | 0.4 |
| S/N Lumi | 3.0 | 3.1 | 2.2 |
| S/N Lumi After Life Test | 2.7 | 2.6 | 1.0 |
| RF Output | +0.4 | +0.6 | +0.4 |
| RF Output After Life Test | +0.4 | +0.5 | 0.0 |
| Friction | 0.17 | 0.17 | 0.20 |
| Friction After Life Test | 0.17 | 0.20 | 0.36 |

From the data recorded in Table 1 above, it can be seen that the magnetic tape according to the invention had both improved magnetic properties and improved friction characteristics.

We claim:

1. A magnetic recording element comprising a carrier and a magnetic coating provided thereon which has a polyester urethane binder, a magnetic pigment and a dispersing agent, the pigment being finely distributed in the binder under the influence of the dispersing agent, characterized in that the dispersing agent is a compound of the following formula:

or a salt thereof, in which
R is an alkyl group or an alkylaryl group having 6–30 C atoms,
$R_1$ is a hydrogen atom, alkyl group having 1–4 C atoms or the group $-(CH_2-CH_2-O)_m-(CH_2-CH_2)_n-SO_3H$ or a salt thereof,
$m = 2-20$,
$n = 0$ or 1, and
$x = 0$ or 1.

2. A magnetic recording element as claimed in claim 1, characterized in that the dispersing agent is a compound according to Formula (1) in which R is an alkyl group having 6–20 C atoms and $R_1$ is a methyl group.

* * * * *